United States Patent [19]

Borgers et al.

[11] Patent Number: 5,109,271
[45] Date of Patent: Apr. 28, 1992

[54] TELEVISION SYSTEM FOR DIGITAL TRANSMISSION OF PICTURE SIGNALS

[75] Inventors: Stephanus M.C. Borgers; Peter H. N. De With, both of Eindhoven, Netherlands

[73] Assignee: U.S. Philips Corporation, New York, N.Y.

[21] Appl. No.: 727,292

[22] Filed: Jul. 9, 1991

Related U.S. Application Data

[63] Continuation of Ser. No. 531,823, Jun. 1, 1990.

[30] Foreign Application Priority Data

Jun. 30, 1989 [NL] Netherlands .................. 8901661

[51] Int. Cl.[5] ................ H04N 11/04; H04N 11/06
[52] U.S. Cl. ........................................ 358/13; 358/12
[58] Field of Search .................. 358/12, 13, 133; 360/22

[56] References Cited

U.S. PATENT DOCUMENTS

| | | | |
|---|---|---|---|
| 4,613,893 | 4/1986 | Weitzel | 358/13 |
| 4,651,194 | 3/1987 | Grallert et al. | 358/13 |
| 4,864,396 | 9/1989 | Martens | 358/133 |
| 4,908,697 | 3/1990 | Tsinberg et al. | 358/133 |
| 4,918,524 | 4/1990 | Ansir et al. | 358/133 |
| 4,920,414 | 4/1990 | Remus et al. | 358/12 |

FOREIGN PATENT DOCUMENTS 3941912 8/1990 Fed. Rep. of Germany.

Primary Examiner—David K. Moore
Assistant Examiner—Wendy R. Greening
Attorney, Agent, or Firm—Michael E. Marion

[57] ABSTRACT

In a television transmission system a digital luminance signal Dy and two digital color difference signals DCHR(1) and DCHR(2) are applied to a distribution circuit 3 at the transmitter end, which digital color difference signals are applied thereto possibly after having been subjected to a vertical decimation operation with a decimation factor R. The distribution circuit 3 partitions all these signals into groups of Q sample per group. After receiving an even number of luminance groups and an even number of chrominance groups, a first half of this number of luminance groups and a first half of this number of chrominance groups is applied to a first auxiliary picture signal output 3(4) of the distribution circuit 3, while simultaneously the other half of the number of luminance groups and the other half of the number of chrominance groups is applied to a second auxiliary picture signal output (3(5)) of the distribution circuit. A transformer for performing a forward two-dimensional Q*Q transform is connected to each of these auxiliary picture signal outputs.

13 Claims, 10 Drawing Sheets

FIG.3A

| i \ r | 1 | 2 | 3 | 4 | 5 | 6 | 7 | 8 | ... | 176 | |
|---|---|---|---|---|---|---|---|---|---|---|---|
| 1 | 4 | 5 | 4 | 5 | 4 | 5 | 4 | 5 | --- | 4 | 5 |
| 2 | 4 | 5 | 4 | 5 | 4 | 5 | 4 | 5 | --- | 4 | 5 |
| 3 | 4 | 5 | 4 | 5 | 4 | 5 | 4 | 5 | --- | 4 | 5 |
| | 4 | 5 | 4 | 5 | 4 | 5 | 4 | 5 | | 4 | 5 |
| 575 | 4 | 5 | 4 | 5 | 4 | 5 | 4 | 5 | | 4 | 5 |
| 576 | 4 | 5 | 4 | 5 | 4 | 5 | 4 | 5 | --- | 4 | 5 |

Y-mod 1

FIG.3B

| i \ r | 1 | 2 | 3 | 4 | 5 | 6 | 7 | 8 | ... | 176 | |
|---|---|---|---|---|---|---|---|---|---|---|---|
| 1 | 5 | 4 | 5 | 4 | 5 | 4 | 5 | 4 | --- | 5 | 4 |
| 2 | 5 | 4 | 5 | 4 | 5 | 4 | 5 | 4 | --- | 5 | 4 |
| 3 | 5 | 4 | 5 | 4 | 5 | 4 | 5 | 4 | --- | 5 | 4 |
| | 5 | 4 | 5 | 4 | 5 | 4 | 5 | 4 | | 5 | 4 |
| 575 | 5 | 4 | 5 | 4 | 5 | 4 | 5 | 4 | | 5 | 4 |
| 576 | 5 | 4 | 5 | 4 | 5 | 4 | 5 | 4 | --- | 5 | 4 |

Y-mod 2

FIG. 3C

Y-mod 4

| i \ r | 1 | 2 | 3 | 4 | 5 | 6 | 7 | 8 | ... | 175 | 176 |
|---|---|---|---|---|---|---|---|---|---|---|---|
| B1 1 | 4 | 5 | 4 | 5 | 4 | 5 | 4 | 5 | --- | 4 | 5 |
| 2 | 4 | 5 | 4 | 5 | 4 | 5 | 4 | 5 | --- | 4 | 5 |
| 3 | 4 | 5 | 4 | 5 | 4 | 5 | 4 | 5 | --- | 4 | 5 |
| 4 | 4 | 5 | 4 | 5 | 4 | 5 | 4 | 5 | --- | 4 | 5 |
| 5 | 5 | 4 | 5 | 4 | 5 | 4 | 5 | 4 | --- | 5 | 4 |
| B2 6 | 5 | 4 | 5 | 4 | 5 | 4 | 5 | 4 | --- | 5 | 4 |
| 7 | 5 | 4 | 5 | 4 | 5 | 4 | 5 | 4 | --- | 5 | 4 |
| 8 | 5 | 4 | 5 | 4 | 5 | 4 | 5 | 4 | --- | 5 | 4 |
| 9 | 4 | 5 | 4 | 5 | 4 | 5 | 4 | 5 | --- | 4 | 5 |
| B3 10 | 4 | 5 | 4 | 5 | 4 | 5 | 4 | 5 | --- | 4 | 5 |
| B144 575 | 5 | 4 | 5 | 4 | 5 | 4 | 5 | 4 | --- | 5 | 4 |
| 576 | 5 | 4 | 5 | 4 | 5 | 4 | 5 | 4 | --- | 5 | 4 |

FIG. 3D

Y-mod 5

| i \ r | 1 | 2 | 3 | 4 | 5 | 6 | 7 | 8 | ... | 175 | 176 |
|---|---|---|---|---|---|---|---|---|---|---|---|
| B1 1 | 5 | 4 | 5 | 4 | 5 | 4 | 5 | 4 | --- | 5 | 4 |
| 2 | 5 | 4 | 5 | 4 | 5 | 4 | 5 | 4 | --- | 5 | 4 |
| 3 | 5 | 4 | 5 | 4 | 5 | 4 | 5 | 4 | --- | 5 | 4 |
| 4 | 5 | 4 | 5 | 4 | 5 | 4 | 5 | 4 | --- | 5 | 4 |
| 5 | 4 | 5 | 4 | 5 | 4 | 5 | 4 | 5 | --- | 4 | 5 |
| B2 6 | 4 | 5 | 4 | 5 | 4 | 5 | 4 | 5 | --- | 4 | 5 |
| 7 | 4 | 5 | 4 | 5 | 4 | 5 | 4 | 5 | --- | 4 | 5 |
| 8 | 4 | 5 | 4 | 5 | 4 | 5 | 4 | 5 | --- | 4 | 5 |
| 9 | 5 | 4 | 5 | 4 | 5 | 4 | 5 | 4 | --- | 5 | 4 |
| B3 10 | 5 | 4 | 5 | 4 | 5 | 4 | 5 | 4 | --- | 5 | 4 |
| B144 575 | 4 | 5 | 4 | 5 | 4 | 5 | 4 | 5 | --- | 4 | 5 |
| 576 | 4 | 5 | 4 | 5 | 4 | 5 | 4 | 5 | --- | 4 | 5 |

FIG. 4C CH-mod 4

FIG. 4D CH-mod 5

FIG.4E

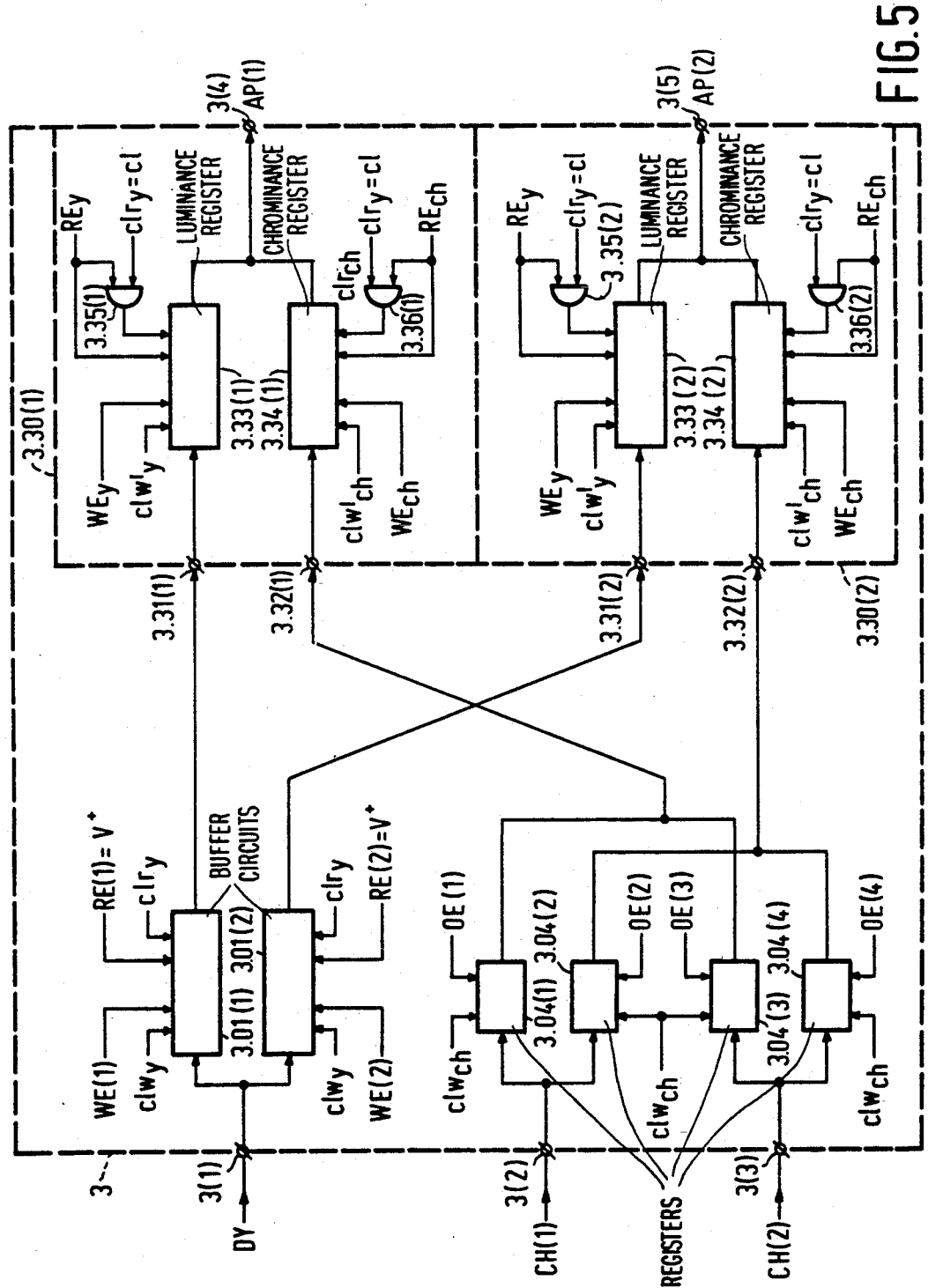

TELEVISION SYSTEM FOR DIGITAL TRANSMISSION OF PICTURE SIGNALS

This is a continuation of application Ser. No. 07/531,823, filed Jun. 1, 1990.

A. BACKGROUND OF THE INVENTION

A(1) Field of the Invention

The invention generally relates to a television transmission system comprising a transmitter station, which includes an encoding station, and comprising a receiver station, which includes a decoding station, for transmitting picture signals in a digital format via a transmission medium. More particularly, the invention relates to a television transmission system of the type in which redundancy-reducing encoding is effected in the encoding station and redundancy-restoring decoding is effected in the decoding station.

Such a television transmission system may form part of a television broadcasting system, in which case the encoding station forms part of the television broadcasting transmitter and each TV receiver includes a decoding station. The transmission medium is the atmosphere in this case. Such a television transmission system may also be a video recording system, in which case the transmission medium is, for example, a video tape or a compact disc.

A(2) Description of the Prior Art

As is generally known, a television picture is completely determined by three picture signals. These may be the three primary colour signals R, G, B or, which is the same, one luminance signal Y and two colour difference signals U and V, also referred to as I and Q. These colour difference signals will hereinafter be referred to as CHR(1) and CHR(2).

As is also generally known, a sampling frequency is associated with each digital signal. This means that the samples constituting this digital signal occur at this sampling frequency. In practice, each sample is represented by a number comprising a given number of bits, For the current digital television transmission systems the sampling frequency is standardized at 13.5 MHz. The sampling is performed in such a manner that 720 samples for each of the three picture signals are obtained for each visible line of the picture. If the number of visible lines per television picture is assumed to be 576 and the number of bits per sample is assumed to be eight, approximately 10 Mbits are to be transmitted for each television picture. At 25 pictures per second this means a bit rate of approximately 250 Mbit/second. This requires a transmission channel having a bandwidth of approximately 125 MHz. In practice, such transmission channels are usually not available. For example, in a video recorder the transmission channel in this case formed by the write head, the tape and the read head has a maximum bandwidth of 30 MHz.

To be able to transmit a television picture in a digital format through a transmission channel having a considerably limited bandwidth, it is common practice (see for example References 1 and 2 in the next section C) to use the luminance signal Y and the two colour difference signals CHR(1) and CHR(2) as picture signals, instead of the three primary colour signals. This choice is made because the luminance signal has a considerably larger signal-energy content than each of the two colour difference signals. If this luminance signal is sampled for its transmission at a frequency $f_Y$, each of the two colour difference signals can be sampled at a lower frequency $f_{CHR}$. More particularly, $f_Y$ is an integral multiple N of $f_{CHR}$. As already stated, $f_Y = 13.5$ MHz and N is chosen to be b 2 for the current television transmission systems. Consequently, the bit rate can be reduced to a value of approximately 167 Mbit/second, which is ⅔ of the original bit rate. Reference 1 states that N may even be chosen to be 3 without serious loss of quality. It also states that the number of colour difference samples to be transmitted can be halved without any noticeable loss of quality by transmitting during one of two successive picture lines the samples of one of the two colour difference signals. For example, during a first picture line the samples of the colour difference signal CHR(1) are transmitted only and during a subsequent picture line the samples of the colour difference signal CHR(2) are transmitted only. The so-called vertical decimating filters with which this is realised (referred to as "Vertikales Chrominanzfilter" in Reference 1) and which have a decimation factor R which in this case is equal to two, thus produce digital auxiliary colour difference signals CH(1) and CH(2). The encoding station of this known transmission system has also an input circuit which receives the picture signal Y and the two auxiliary colour difference signals CH(1) and CH(2) and which has two auxiliary picture signal outputs at which a first and a second auxiliary picture signal occur. More particularly, the first auxiliary picture signal is equal to the luminance signal and the second auxiliary picture signal is constituted by a time-division multiplex of the samples of the one auxiliary colour difference signal CH(1) of the one picture line and the samples of the other auxiliary colour difference signal CH(2) of the subsequent picture line.

For a further bit rate reduction the samples of the luminance signal Y occurring at the first auxiliary picture signal output are also applied to a first redundancy-reducing encoding circuit and the samples of the multiplex signal occurring at the second auxiliary picture signal output are also applied to a second redundancy-reducing encoding circuit. Both redundancy-reducing encoding circuits are differential pulse code modulators.

Each redundancy-reducing encoding circuit produces a channel signal which is applied to the transmission medium by means of an output circuit. These signals applied to the transmission medium will be referred to as transmission medium signals.

It is to be noted that it is known per se to realise redundancy reduction in a way other than by means of differential pulse code modulation, for example, by performing a Q*Q forward transform. In that case all those samples of a picture signal forming one complete picture are considered as elements (pixels) of a matrix. This matrix is divided into sub-matrices of Q by Q matrix elements and this sub-matrix is written as the sum of $Q^2$ orthonormal Q*Q basic matrices each with its own weighting factor (coefficient). In such a redundancy reduction a part of the said weighting factors is transmitted instead of the original samples.

Yet another method of realising redundancy reduction is the use of differential pulse code modulation combined with a Q*Q forward transform. Such a combination is also referred to as hybrid encoding (see, for example Reference 3).

For regaining the original picture signals Y, CHR(1) and CHR(2) the receiver station of the television transmission system described in Reference 1 has an input circuit which can be coupled to the transmission medium and which regenerates the original two channel signals, starting from the information (transmission medium signals) present at this transmission medium. Each channel signal is applied in a decoding station to an individual redundancy-restoring decoding circuit whose operation is inverse to the said redundancy-reducing encoding circuits and each of them supplies a regenerated local auxiliary picture signal. These two auxiliary picture signals are converted by means of an output circuit into the original luminance signal Y and the original two auxiliary colour difference signals CH(1) and CH(2), which signals occur at separate outputs of this output circuit. The two auxiliary colour difference signals are subjected to a vertical interpolation operation so as to generate the original colour difference signals CHR(1) and CHR(2).

As is known, much research has been done in the field of high-definition television in the last few years. High-definition television picutres comprise, for example 1250 lines of which 1152 are visible and carry picture information. Moreover, the aim is a higher horizontal resolution in combination with a higher aspect ratio, namely 16:9; in the current television picutres this ration is 4:3. It is to be noted that the aspect ratio of a television picture is the ratio between the horizontal and the vertical dimension of the picture. Transmission of picture signals for such picutres in a digital format implies in the first place that the required sampling frequencies must be chosen to be considerably higher than is common practice in the current television transmission systems. For obtaining, inter alia a sufficiently high horizontal resolution, a sampling frequency of 54 MHz is recommended. If such a high sampling frequency were used in the television transmission system described in Reference 1, it would mean that the one redundancy-reducing encoding circuit receives samples (namely those of the luminance signal) at a rate of 54 MHz and the other at a rate of 18 MHz.

When using such a transmission system in consumer apparatus such as, for example digital video recorders, the aim will be a high degree of integration. If the integrated circuits are formed in the currently most advanced integration technique, which is known under the name of CMOS, a high internal processing rate, namely up to 30 MHz is possible at a high integration density. When integrating the redundancy-reducing encoding circuit receiving samples at a rate of 54 MHz, this internal processing rate of 30 MHz is absolutely insufficient. It is to be noted that it is possible to integrate an encoding circuit by means of CMOS techniques and to realise an internal processing rate of 54 MHz or more, but this is at the expense of the integration density. In fact, this density considerably decreases with an increasing processing rate. The required chip surface and hence the price of the chip increase considerably.

B. SUMMARY OF THE INVENTION

The invention has for its object to provide a television transmission system of the type described hereinbefore in relation to Reference 1 and which is particularly suitable for transmitting high-definition television pictures, permitting a high degree of integration and being particularly suitable for digital video recording.

To this end the television transmission system according to the invention is characterized in that:

- each of the two redundancy-reducing encoding circuits is adapted to perform a two-dimensional Q*Q forward transform;
- the input circuit of the encoding circuit is adapted to perform a distribution operation in which the luminance signal DY and the two auxiliary colour difference signals CH(1) and CH(2) are partitioned into luminance groups and chrominance groups, respectively, with Q samples per group, each time of an even number of successive luminance groups and an even number of chrominance groups a first half of said number of luminance groups and a first half of said number of chrominance groups are applied in a time-division multiplex format to the first auxiliary picture signal output and the other half of said number of luminance groups and the other half of said number of chrominance groups are applied in a time-division multiplex format to the second auxiliary picture signal output;
- the redundancy-restoring decoding circuit is adapted to perform a two-dimensional Q*Q inverse transform;
- the output circuit of the decoding station is adapted to perform a rearrangement operation which is inverse to the distribution operation.

By using the measures according to the invention it is achieved that both groups of samples of the luminance signal and groups of samples of each of the two auxiliary colour difference signals are distributed between the two auxiliary picture signal outputs. As a result, the rate at which samples occur at each of these outputs can be adapted to the internal processing rate of the redundancy-reducing encoding circuits. More particularly it appears that N can be chosen to be 4 for high-definition television picutres and it is common practice to perform 8*8 forward transforms in the redundancy-reducing encoding circuits. Since one half of the total number of groups is applied to the one auxiliary picture signal output and the other half is applied to the other auxiliary picture signal output, the samples can be presented to each encoding circuit at a rate of approximately 27 MHz. Each redundancy-reducing encoding circuit now supplies a channel signal at a bit rate of approximately 100 MHz. It is true that this bit rate will usually be too high to enable the two channel signals to be transmitted through a common transmission channel, but two separate transmission channels, one for each channel signal, are amply sufficient for this purpose. Since each channel signal comprises luminance information as well as colour information of a television picture, a drop-out of a transmission channel, for example, because one of the two read heads in a video recorder has become defective, will still yield a recognizable colour television picture.

A very practical number of successive luminance groups is 2N. After this number of luminance groups is applied to the distribution circuit, this circuit has also received 4/R chrominance groups.

The distribution between the two auxiliary picture signal outputs will preferably be effected as regularly as possible. This can particularly be achieved by applying the successive luminance groups alternately to the first and to the second auxiliary picture signal output.

C. REFERENCES

1. Aufwandsarmen DPCM-Coder für die TV-Verteilung mit 72 Mbit/s; P. Neuhold; Nachrichtentechnische Zeitschrift, Vol. 41, No. 9, September 1988, pp. 506-511.
2. Adaptive coding of monochrome and colour images; W. H. Chen, C. H. Smith; IEEE Transactions on Communications, Vol. COM-25, No. 11, November 1977, pp. 1285-1292.
3. Videobild auf der Datenleitung; P. Vogel; Funkschau No. 26, Dec. 16, 1988, pp. 60-63.
4. One-dimensional linear picture transformer. R. Woudsma, D. C. H. Chong, B. T. Mc Sweeney, S. M. Borgers, E. A. P. Habraken; European Patent Application No. 0,286,184.

D. EXPLANATION OF THE INVENTION

D(1) Brief Description of the Figures

FIG. 1 shows diagrammatically the television transmission system according to the invention in the form of a video recorder;

FIGS. 2, 3(a–d) and 4(a–g) show diagrams to explain the operation of the television transmission system of FIG. 1;

FIG. 5 shows diagrammatically the structure of a distribution circuit for use in the television transmission system of FIG. 1;

D(2) General Structure of the Television System

Figure 1:
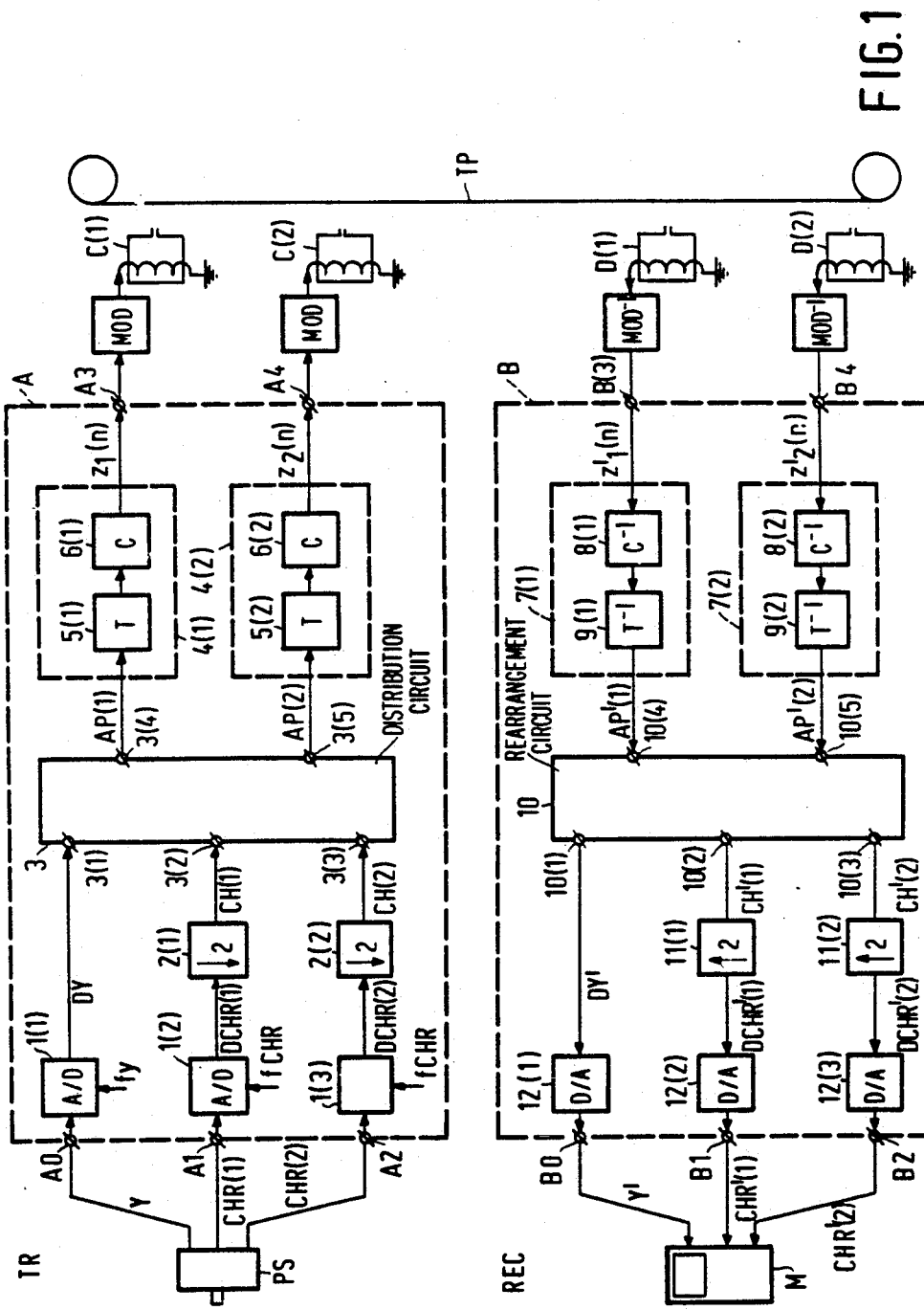

FIG. 1 shows diagrammatically a video recorder provided with the television transmission system according to the invention. It comprises a transmitter station TR including an encoding station A and a receiver station REC including a decoding station B. The encoding station A has three inputs A0, A1, A2 for receiving a luminance signal Y, a colour difference signal CHR(1) and a colour difference signal CHR(2), respectively, which are supplied by a picture signal source PS, for example a video camera. It will hereinafter be assumed that each television picture comprises two successively occurring fields whose composite picture lines are interlaced. The encoding station A has also two outputs A3, A4 at which serial bit currents occur which will be referred to as channel signals $Z_1(n)$ and $Z_2(n)$. These channel signals are converted by means of separate modulation circuits MOD into transmission medium signals which in their turn are recorded simultaneously but separately on a magnetic tape TP via separate write heads C(.), for example on separate tracks.

To regain the original picture signals, the decoding station B has two inputs B3, B4 which are connected to separate read heads D(.) via separate demodulation circuits $MOD^{-1}$. These read heads can be coupled to the magnetic tape TP in such a way that they convert the information which is present on this magnetic tape into the original transmission medium signals which lead to local channel signals $Z'_1(n)$ and $Z'_2(n)$ after demodulation in the demodulation circuits $MOD^{-1}$, which channel signals correspond to the original channel signals $Z_1(n)$ and $Z_2(n)$ as are supplied by the encoding station A. This decoding station B also has three outputs B0, B1, B2 at which locally generated versions Y', CHR'(1) and CHR'(2) of the original picture signals Y, CHR(1) and CHR(2) occur. These local picture signals are applied to a monitor M.

In the encoding station A the three picture signals Y, CHR(1) and CHR(2) are sampled in A/D converters 1(1), 1(2), 1(3), respectively, at suitably chosen sampling frequencies $f_Y$ and $f_{CHR}$ and the samples thus obtained are converted into, for example 8-bit PCM words, hereinafter generally referred to as picture signal samples but more particularly the samples of the luminance signal Y being referred to as luminance samples and those of each of the colour difference signals being referred to as colour difference samples. It will be assumed that $f_Y=54$ MHz and $f_{CHR}=13.5$ MHz so that the ratio $N=f_Y/f_{CHR}=4$. These A/D converters thus supply the digital picture signals Dy, DCHR(1) and DCHR(2), respectively. The digital colour difference signals DCHR(1) and DCHR(2) are subjected to a vertical decimation operation in vertical decimating filter devices 2(1) and 2(2) which have a decimation factor of $R=2$. They suppress all colour difference samples of one of two successive picture lines of a field and thus supply digital auxiliary colour difference signals CH(1) and CH(2).

The digital luminance signal and the two digital auxiliary colour difference signals are applied to inputs 3(1), 3(2) and 3(3), respectively, of a distribution circuit 3 which has two auxiliary picture signal outputs 3(4) and 3(5). this distribution circuit will be further described in D(3). In this respect it is to be noted that this distribution circuit supplies auxiliary picture signals AP(1) and AP(2) at each of its auxiliary picture signal outputs.

A redundancy-reducing encoding circuit 4(.) is connected to each auxiliary picture signal output 3(4), 3(5). This circuit is constituted by a cascade circuit of a transformer 5(.) and an encoder 6(.). The transformer 5(.) is adapted to perform a two-dimensional forward Q*Q transform, for example, a Discrete Cosine Transform (abbreviated DCT). It is common practice to choose Q to be equal to eight. This will also be the case in this description. Many examples of such a transformer have been described in literature; see, for example Reference 4. Generally it can be noted that such a transformer each time converts a two-dimensional matrix of 8*8 picture signal samples into a matrix of 8*8 so-called coefficients. The encoder 6(.) receives the 64 coefficients thus obtained and encodes them in a suitable way; for example, in the way as has extensively been described in Reference 2 and each time converts a matrix of coefficients into a block of serial bits. The redundancy-reducing encoding circuits 4(.) thus formed thus supply the previously mentioned channel signals $Z_1(n)$ and $Z_2(n)$.

In the decoding station B the local channel signals $Z'_1(n)$ and $Z'_2(n)$ supplied by the demodulators $MOD^{-1}$ are applied to redundancy-restoring decoding circuits 7(.). They are both constituted by a cascade circuit of a decoder 8(.) and a transformer 9(.). The decoder each time reconstructs a matrix of 64 coefficients from the received local channel signals. This matrix is subjected in the transformer 9(.) to a two-dimensional inverse 8*8 transform (in this case, for example an inverse Discrete Cosine Transform) so that each matrix of coefficients is converted into a matrix of 8*8 picture signal samples. These are applied as local auxiliary picture signals AP'(1) and AP'(2) to inputs 10(4) and 10(5) of a rearrangement circuit 10 which performs an operation which is inverse to the operation performed by the distribution circuit 3. This rearrangement circuit thus supplies at its outputs 10(1), 10(2), 10(3) a local digital luminance signal DY', a local digital auxiliary colour difference signal CH'(1) and a local digital auxiliary colour difference signal CH'(2), respectively. The two local digital auxiliary colour difference signals are subjected in vertically interpolating filter devices 11(.) to a vertical interpolation operation, where the interpolation factor R is equal to the decimation factor, i.e. two in this case. This operation is thus inverse to the vertical decimating operation and reconstructs for each field all non-transmitted colour difference samples of one of two successive picture lines. They thus supply the local digital colour difference signals DCHR'(1) and DCHR'(2). The local digital luminance signal DY' as well as the local digital colour difference signals DCHR'(1) and DCHR'(2) are applied to respective D/A converters 12(.) and converted into local analog picture signals Y', CHR'(1) and CHR'(2) which are applied to the monitor M.

D(3) The Distribution Circuit

Figure 2:
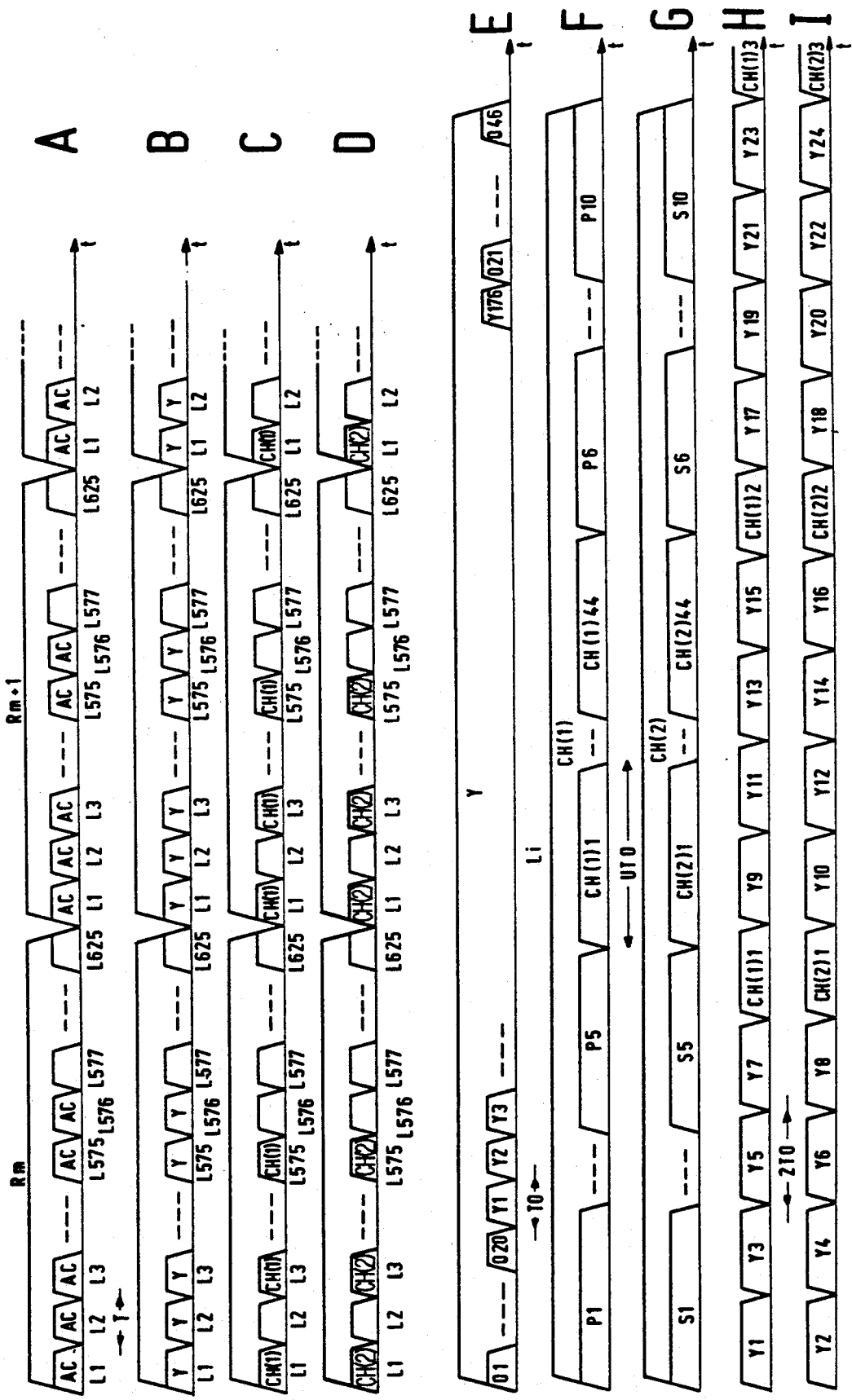

FIG. 2 shows diagrammatically some time diagrams to explain the operation of the distribution circuit 3 for distributing picture signals of high-definition television pictures. As already noted, such television picutres comprise 1250 picture lines. It will be assumed that each television picture of this type is supplied by the video source PS in the form of two successive interlaced fields, with each field comprising 625 picture lines. In FIG. 2 the successive picture lines of the two successive fields $R_m$ and $R_{m+1}$ of a picture are denoted at A by means of blocks. These picture lines are enumerated L1 to L625 for each field and have a period T (=32 μsec). As is known, not all picture lines of a field comprise picture signals. It will be assumed that only the picture lines L1 to L576 of a field comprise picture signals and these picture lines will be referred to as the active picture lines of a field. The other picture lines of a field will be referred to as passive picture lines. These active picture lines bear the inscription AC at A in FIG. 2. At B in FIG. 2 those active picture lines whose luminance samples are applied to the input 3(1) of the distribution circuit are denoted by means of the inscription Y. At C those active picture lines whose colour difference samples of the colour difference signal CH(1) are applied to the input 3(2) of the distribution circuit are denoted by means of the inscription CH(1) and at D those active picture lines whose colour difference samples of the colour difference signal CH(2) are applied to the input 3(3) of the distribution circuit are denoted by means of the inscription CH(2). It is to be noted that in the case considered the inputs 3(2) and 3(3) of the distribution circuit only receive colour difference samples of the odd picture lines.

Each picture line (period 32 μsec) has a length which corresponds to 1728 sampling periods $T_y = 1f_y$. Each active picture line comprises an active line section and passive line sections. The active line section is the section where picture signals may occur, whereas no picture signals but, for example, line-synchronizing pulses, field-synchronizing pulses and frame-synchronizing pulses may occur in the passive sections. Normally, the active line section begins and ends a first and a second predetermined period, respectively, after the occurrence of the line-synchronizing pulse. It will be assumed that the first-mentioned period corresponds to 160 periods $T_y$ and the said second period corresponds to 160+1408 periods $T_y$. In other words, the active line section has a length of 1408 sampling periods $T_y$.

Each picture line bearing the inscription Y of the time diagram shown at B in FIG. 2 symbolizes a series of 1728 luminance samples, with only those luminance samples of the active sections of the active lines in principle having a value which is unequal to zero. Such a picture line is shown at a smaller scale in the time diagram E. The 1728 luminance samples of this series are partitioned into 1728/Q=216 groups of Q=8 luminance samples each by the distribution circuit. Those groups which comprise in principle non-zero luminance samples of the active section of an active picture line will be referred to as luminance groups. In the time diagram E these luminance groups successively bear the inscriptions $Y_1$ to $Y_{176}$ and the other groups which comprise in principle luminance samples which are zero successively bear the inscriptions $O_1$ to $O_{40}$. It is to be noted that such a group occurs in a time interval $T_0 = 8T_y$.

Each picture line with the inscriptions CH(1) and CH(2) of the time diagrams C and D symbolizes a series of 432 colour difference samples which occur at a rate of 13.5 MHz, while only those colour difference samples of the active sections of the active lines in principle have a value which is unequal to zero. These picture lines are shown at a smaller scale in the time digrams F and G. Each one of such a series of 432 colour difference samples is partitioned into 432/Q=54 groups of Q=8 colour difference samples each by the distribution circuit. Those groups which comprise in principle non-zero colour difference samples of the active section of an active picture line will be referred to as chrominance groups. Time diagrams F show these chrominance groups which are successively denoted by $CH(1)_1$ to $CH(1)_{44}$, while the other groups are denoted $P_1$ to $P_{10}$. In a corresponding manner, time diagram G shows the chrominance groups which are successively denoted by $CH(2)_1$ to $CH(2)_{44}$ and the other groups which are denoted $S_1$ to $S_{10}$.

The distribution circuit now applies four luminance groups and one chrominance group of 2N=8 successive luminance groups and 4/R=2 chrominance groups to each of the two auxiliary picture signal outputs 3(4) and 3(5). More particularly it applies the successive luminance groups of a picture line alternately to the one and to the other output 3(4) and 3(5), respectively, and one chrominance group is applied to each output each time after 2N(=8) luminance groups have been distributed. All this is shown diagrammatically in the time diagrams H and I of FIG. 2. More particularly the time diagram H shows the groups which occur at auxiliary picture signal output 3(4) and the time diagram I shows the groups which occur at auxiliary picture signal output 3(5). Due to this distribution of the luminance and chrominance groups between the two auxiliary picture signal outputs, each of these outputs is available for a time interval $2T_0$ so as to transfer the eight picture signal samples of a group to the transformer 4(.). All picture signal samples now occur at a rate of 27 MHz at the auxiliary picture signal outputs 3(4) and 3(5). This is half the rate at which the luminance samples occur at the input 3(1). It is true that this is twice the rate at which the colour difference samples occur at the outputs of the A/D converters 1(2) and 1(3), but this rate of 27 MHz is below the permitted rate of 30 MHz which is prescribed by the transformer 4(.).

The above-mentioned distribution of the groups of picture signal samples can be effected in different ways while taking the above considerations into account, the distribution of the luminance groups between the two outputs being independent of the distribution of the chrominance groups.

The different distribution possibilities for the luminance groups will be further described with reference to FIGS. 3A to 3D. More particularly each of these FIGS. 3A-D shows a field of a television picture. This field comprises 576 visible picture lines Li with i=1, 2, 3, ... 576 and each picture line is partitioned into 176 luminance groups $Y_r$ with r=1, 2, 3, ... 176.

The distribution of the luminance groups between the two auxiliary picture signal outputs 3(4) and 3(5) can now be effected in the way shown in FIG. 3A such that the luminance groups having an odd ordinal number r of each picture line are applied to the auxiliary picture signal output 3(4) and those having an even ordinal number r are applied to the auxiliary picture signal output 3(5). In FIGS. 3A-3D these outputs are denoted by the reference numerals 4 and 5 for the sake of brevity. In other words, if a luminance group $Y_r$ of picture line Li is applied to auxiliary picture signal output 3(5), the numeral 5 is in the relevant box. If it is applied to auxiliary picture signal output 3(4), the numeral 4 is in the relevant box. This distribution of the luminance groups will be referred to as first luminance distribution mode and is denoted Y-mod 1 in FIG. 3A.

A second luminance distribution mode is shown in FIG. 3B and denoted by Y-mod 2. The luminance groups are distributed between the two outputs in such a way that the output 3(4) each time receives the even luminance groups and output 3(5) only receives the odd luminance groups.

In a third luminance distribution mode the luminance groups of two successive picutres are subjected to the first luminance distribution mode Y-mod 1 for the one picture and the luminance groups of the other picture are subjected to the second luminance distribution mode Y-mod 2.

A fourth luminance distribution mode is shown in FIG. 3C and denoted by Y-mod 4. In this mode each time Q/2=4 successive picture lines of a field are considered as a block of picture lines. The 576 visible lines of a field can be partitioned into 144 of such picture line blocks. FIG. 3C shows these picture line blocks which are denoted by B1, B2, ... B144. Furthermore, the luminance groups of the picture line blocks B1, B3, ... having an odd ordinal number are subjected to the first luminance distribution mode Y-mod 1 and the luminance groups of the picture line blocks B2, B4, ... having an even ordinal number are subjected to the second luminance distribution mode Y-mod 2.

A fifth luminance distribution mode is shown in FIG. 3D and is denoted by Y-mod 5. This luminance distribution mode differs from the fourth luminance distribution mode in that the picture line blocks B1, B3, ... with an odd ordinal number are now subjected to the second luminance distribution mode Y-mod 2 and the picture line blocks B2, B4 ... with an even ordninal number are subjected to the first luminance distribution mode.

In a sixth luminance distribution mode one picture of two successive pictures is subjected to the fourth luminance distribution mode Y-mod 4 and the other picture is subjected to the fifth luminance distribution mode Y-mod 5.

The choice of the above-described luminance distribution modes in a concrete case is determined by the picture quality desired at the receiver end on the one hand and by the price of the system on the other hand. The influence of the different luminance distribution modes on the picture quality in the receiver station may be best examined by checking to what extent the picture quality decreases if one of the two inputs 10(4) or 10(5) of the rearrangement circuit 10 in the decoding station B (see FIG. 1) does not receive a signal. Let it be assumed that this is input 10(5). Since this input 10(5) receives all luminance groups which occur at the output 3(5) of the distribution circuit, it means that all those luminance groups which are denoted by 5 in FIGS. 3A-3D do not contribute to the picture on monitor M. In the case of the first or the second luminance distribution mode this means that the picture exhibits vertical dark stripes. When using the third luminance distribution mode Y-mod 3, these dark stripes disappear because both the luminance groups with an even ordinal number and those with an odd ordinal number, though at half the picture frequency, are applied to the input 10(4) of the rearrangement circuit. When using the fourth luminance distribution mode Y-mod 4 shown in FIG. 3C or the fifth luminance distribution mode shown in FIG. 3D the picture on monitor M will exhibit dark areas, like the distribution of the dark fields on a chessboard. These dark areas disappear by using the sixth luminance distribution mode in which all luminance groups are applied once to the input 10(4) of the rearrangement circuit each time after two pictures.

As already noted, the distribution of the chrominance groups can be performed independently of the selected luminance distribution mode. The different distribution possibilities for the chrominance groups will be further described with reference to FIGS. 4A to 4F. Likewise as in FIGS. 3A to 3D, each of these FIGS. 4A to 4F shows a field of a television picture comprising 576 visible picture lines Li with i=1, 2, ... 576 and each odd picture line is partitioned into 44 chrominance groups $CH(1)_s$ with S=1, 2, 3, ... 44 and 44 chrominance groups $CH(2)_s$ (see also FIG. 2).

Since in the case considered a chrominance group $CH(2)_s$ occurs simultaneously with the occurrence of a chrominance group $CH(1)_s$, these groups will be considered as a unit. Such a unit will be denoted by the symbol shown in FIG. 4G, which symbol is in the form of a rectangle partitioned into two triangles by means of a diagonal. Either the numeral 4 or the numeral 5 will be placed in each of these triangles. The numeral in the triangle to the left of the diagonal denotes the output 3(.) of the distribution circuit to which output the chrominance group $CH(1)_s$ is applied and the numeral in the triangle to the right of the diagonal denotes the output 3(.) of the distribution circuit to which output the chrominance group $CH(2)_s$ is applied.

Figure 4A:
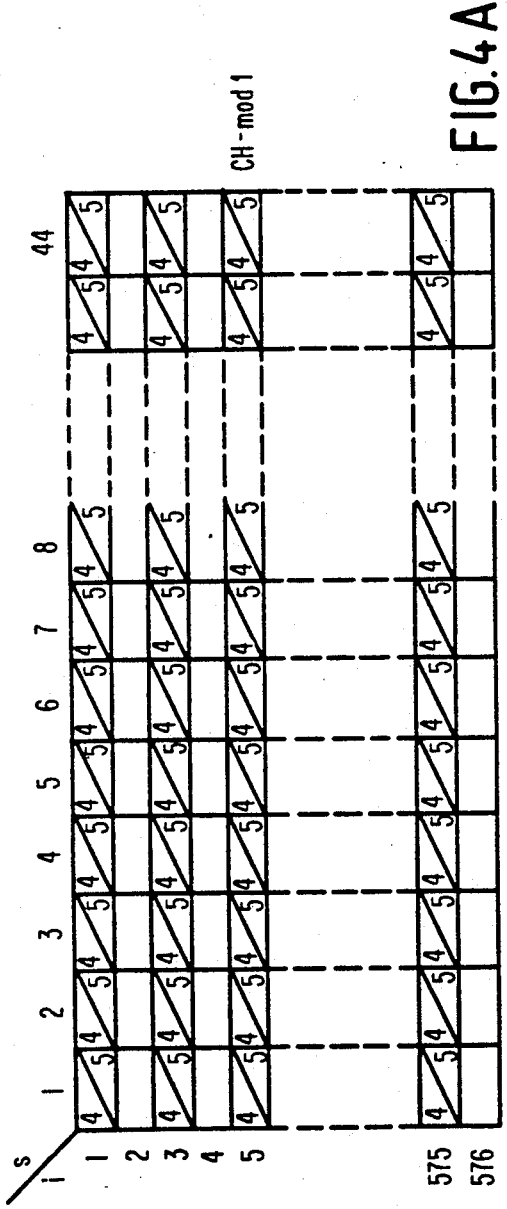

The distribution of the chrominance groups between the two outputs 3(4) and 3(5) can now be performed in the manner shown in FIG. 4A such that the chrominance groups $CH(1)_s$ of each relevant picture line are applied to output 3(4) and the associated chrominance groups $CH(2)_s$ are applied to the output 3(5). This distribution of the chrominance groups will be referred to as first chrominance distribution mode and will be denoted by CH-mod 1.

Figure 4B:
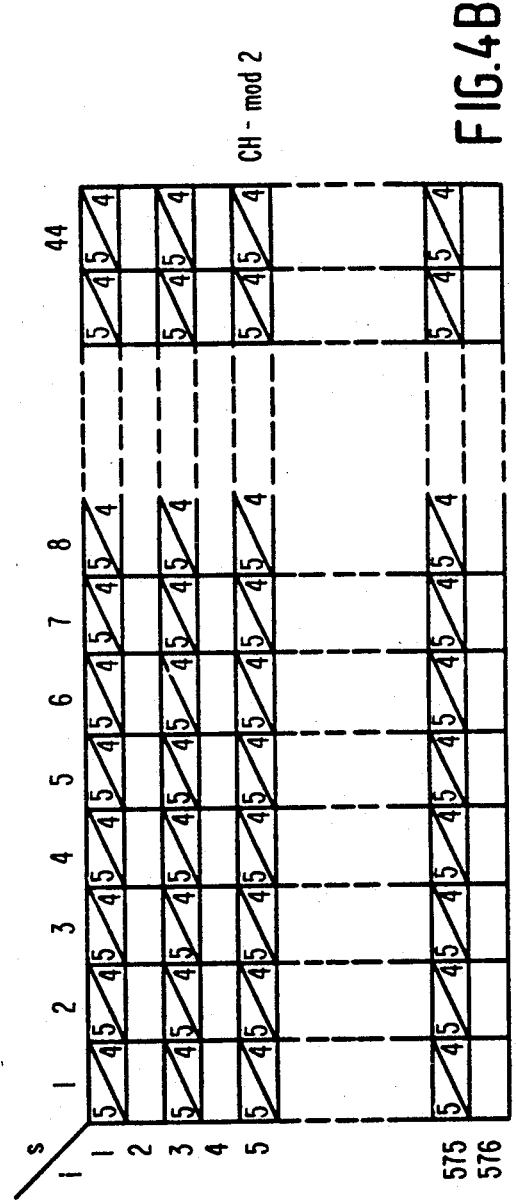

A second chrominance distribution mode is shown in FIG. 4B and will be denoted by CH-mod 2. It differs from the first chrominance distribution mode in that the chrominance groups $CH(1)_s$ are now applied to the output 3(5) and the chrominance groups $CH(2)_s$ are applied to the output 3(4).

In a third chrominance distribution mode the chrominance groups of the one picture of two successive pictures are each time subjected to the first chrominance distribution mode CH-mod 1 and those of the other picture are subjected to the second chrominance distribution mode CH-mod 2.

Figures 4C, 4D:
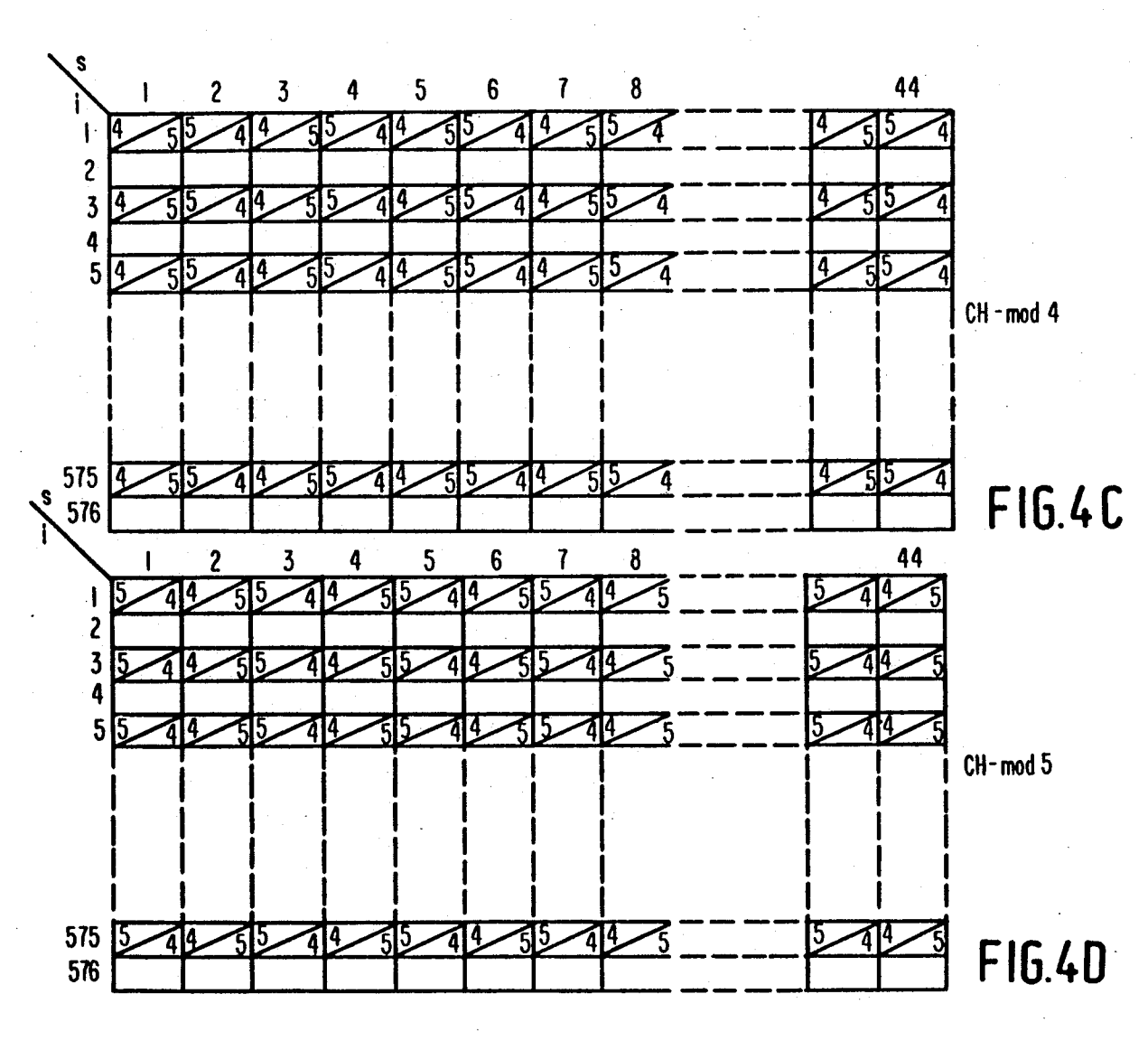

A fourth chrominance distribution mode is shown in FIG. 4C and will be denoted by CH-mod 4. Each time the chrominance groups $CH(1)_s$ having an odd ordinal number s are applied to the output 3(4) while simultaneously the chrominance groups $CH(2)_s$ having an odd ordinal number s are applied to output 3(5). Conversely, the chrominance groups $CH(1)_s$ having an even ordinal number s are applied to output 3(5), while simultaneously the chrominance groups $CH(2)_s$ having an even ordinal number s are applied to output 3(4).

A fifth chrominance distribution mode CH-mod 5 is shown in FIG. 4D. It differs from the fourth chrominance distribution mode CH-mod 4 in that the chrominance groups $CH(1)_s$ having an odd ordinal number are now applied to output 3(5) and those having an even ordinal number are applied to output 3(4), while the chrominance groups $CH(2)_s$ having an odd ordinal number are applied to output 3(4) and those having an even ordinal number s are applied to output 3(5).

In a sixth chrominance distribution mode CH-mod 6 the chrominance groups of the one picture of two successive pictures are each time subjected to the fourth chrominance distribution mode CH-mod 4 and those of the other picture are subjected to the fifth chrominance distribution mode CH-mod 5.

Figure 4E:
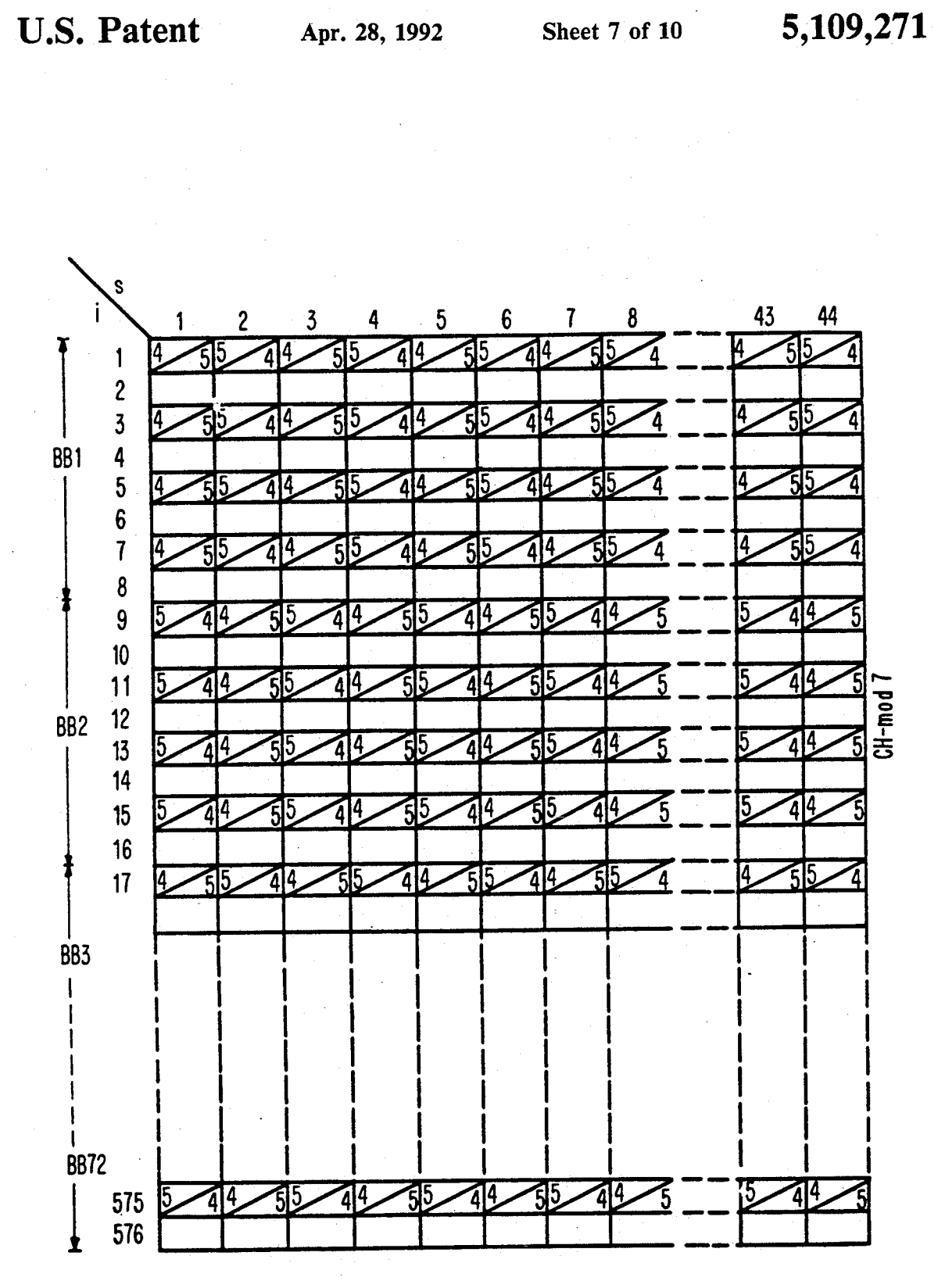

A seventh chrominance distribution mode CH-mod 7 is shown in FIG. 4E. In this mode each time Q (=8) successive picture lines of a field are considered as an auxiliary picture line block. A TV picture can be partitioned into 72 of such auxiliary picture line blocks. In FIG. 4E these blocks are denoted by BB1, BB2, ... BB72. The chrominance groups of the auxiliary picture line blocks having an odd ordinal number (BB1, BB3, ... BB71) are subjected to the fourth chrominance distribution mode CH-mod 4 and the chrominance groups of the auxiliary picture line blocks having an even ordinal number (BB2, BB4 ... BB72) are subjected to the fifth chrominance distribution mode CH-mod 5.

Figures 4F, 4G:
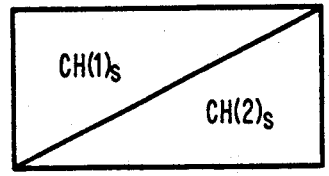

An eighth chrominance distribution mode CH-mod 8 is shown in FIG. 4F and it differs from the seventh chrominance distribution mode CH-mod 7 in that the auxiliary picture line blocks having an odd ordinal number (BB1, BB3, ... BB71) are now subjected to the fifth chrominance distribution mode CH-mod 5 and the auxiliary picture line blocks having an even ordinal number (BB2, BB4, ... BB72) are subjected to the fourth chrominance distribution mode CH-mod 4.

In a ninth chrominance distribution mode CH-mod 9 the chrominance groups of the one picture of two successive pictures are each time subjected to CH-mod 7 and those of the other picture are subjected to CH-mod 8.

The best choice of the above-described chrominance distribution modes in a concrete case again depends on the desired picture quality on the one hand and on the price of the system on the other hand. As far as the picture quality is concerned, the remarks made in connection with the different luminance distribution modes are applicable. If one of the two local auxiliary picture signals AP'(1) or AP'(2) is absent at the receiver end (see FIG. 1), the best possible picture quality on monitor M is achieved when using the sixth luminance distribution mode Y-mod 6 and the ninth chrominance distribution mode CH-mod 9.

An embodiment of the distribution circuit 3 is shown in FIG. 5. This distribution circuit is particularly adapted to perform the luminance distribution mode Y-mod 6 and the chrominance distribution mode CH-mod 3. For distributing the luminance samples, two buffer circuits 3.01(1) and 3.01(2) are connected to the input 3(1), each of which circuits may be in the form of a fifo. They are controlled by write pulses $clw_y$ which occur at the sampling frequency $f_y$, by write-enable signals WE(1) and WE(2), by read-enable signals RE(1) and RE(2) and by read pulses $clr_y$ which will be assumed to occur at a frequency of 27 MHz. Of the luminance samples occurring at a frequency of 54 MHz at the input 3(1) Q=8 samples will alternately be written in the one fifo and 8 samples will be written in the other fifo under the control of the write pulses $clw_y$ and the write-enable signals WE(.). In the embodiment shown the read-enable signals RE(.) are constantly positive, which means that they do not block the reading of samples from the fifo. In response to each read pulse $clr_y$ a luminance sample is read from a fifo. The output of fifo 3.01(1) is connected to the input 3.31(1) of a multiplexer circuit 3.30(1) and the output of fifo 3.01(2) is connected to the input 3.31(2) of a multiplexer circuit 3.30(2).

Figure 6:
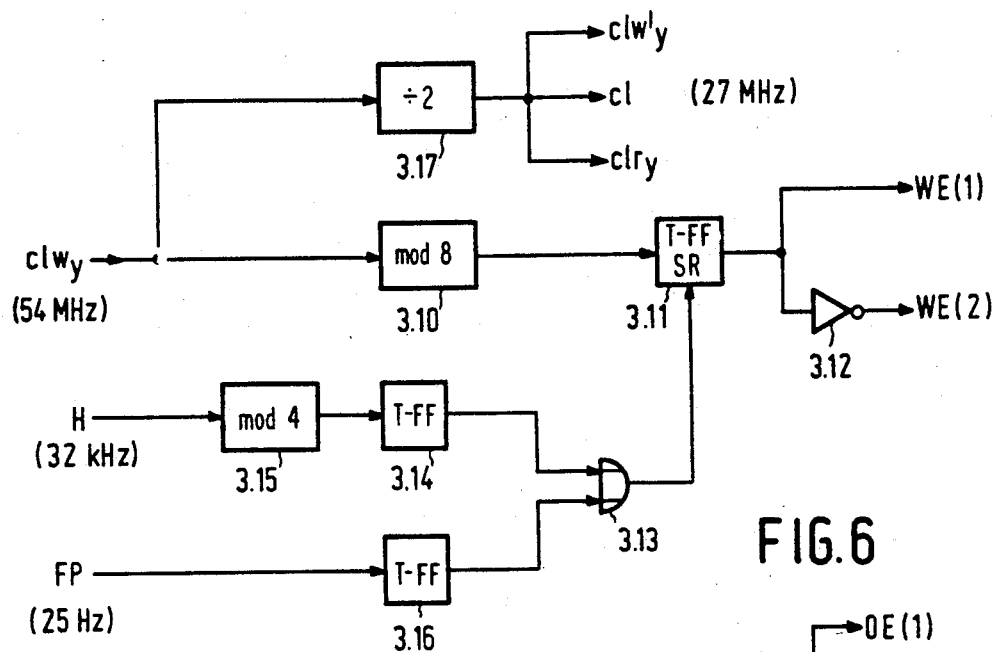
FIGS. 6, 7 and 8 show some control circuits for controlling the distribution circuit shown in FIG. 5.

The write-enable signals WE(.) can be generated by means of the control circuit shown in FIG. 6. This circuit more particularly comprises a modulo-8-counter 3.10 which receives the write pulses (54 MHz) $clw_y$ and which supplies a toggle pulse to a so-called toggle flip-flop 3.11 whenever a predetermined count occurs, while the output signal of said flip-flop represent, for example the write-enable signal WE(1) and a version of the write enable signal WE(2) inverted by means of an inverter 3.12. To ensure that these write-enable signals have the correct value at the start of each picture line and the start of each picture, this toggle flip-flop is of the set reset type, for example, the Signetics SN 7473. This flip-flop not only reacts to the toggle pulses supplied by the modulo-8-counter 3.10 but also to so-called set-reset pulses which it receives at a set-reset input SR. In the embodiment shown these set-rest pulses are supplied by an OR gate 3.13. It receives the output pulses via a first input from a toggle flip-flop 3.14 which is controlled by a modulo-4- counter 3.15 which receives pulses H occurring at the line frequency which is approximately equal to 32 kHz for high-definition television pictures with 1250 lines per picture. This modulo-4-counter 3.15 supplies a toggle pulse for toggle flip-flop 3.14 whenever a predetermined count occurs. Via a second input OR gate 3.13 receives output pulses from a toggle flip-flop 3.16 which receives frame-synchronizing pulses FP (25 Hz) at its input. In this way it is achieved that the toggle flip-flop 3.11 is set to a defined starting position each time after four picture lines of the field and each time after two fields. This control circuit further comprises a frequency divider 3.17 which receives the write pulses $clw_y$ (54MHz) and divides them by a factor 2. It thus supplies clock pulses Cl, the read pulses $clr_y$ and further write pulses $clw'_y$ which occur at a frequency of 27 MHz.

For distributing the colour difference samples of the two auxiliary colour difference signals CH(1) and CH(2), two registers 3.04(1), 3.04(2) and 3.04(3), 3.04(4) are connected to each of the inputs 3(2) and 3(3), respectively, of the distribution circuit 3. Particularly, registers of the type having a 3-state output, for example the Signetics SN 74374 can be chosen for this purpose. Although such registers are generally known, it is to be noted that they can be controlled by means of a logic output enable signal OE(.) in such a way that the output can assume the logic value "1" or the logic value "0", for example, if OE(.) has the logic value "1", or if the internal resistance, viewed from the output, assumes a very high value, for example if OE(.)=0. The latter property provides the possibility of directly interconnecting outputs of such registers so as to obtain a wired OR circuit. More particularly the outputs of the registers 3.04(1) and 3.04(3) are interconnected and are connected to the input 3.32(1) of the multiplexer circuit 3.30(1), while the outputs of the registers 3.04(2) and 3.04(4) are interconnected and are connected to the input 3.32(2) of multiplexer circuit 3.30(2).

Figure 7:
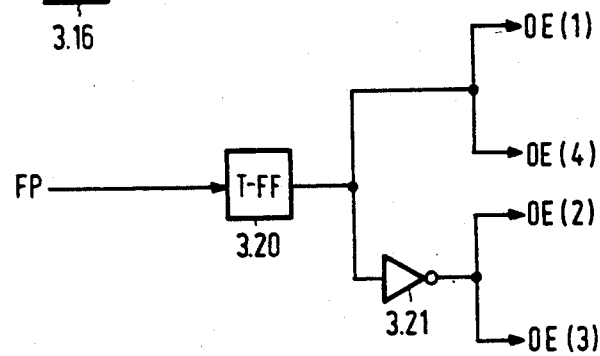

The registers 3.04(.) are not only controlled by the output enable signals OE(.) but also by write pulses clw$_{ch}$ which occur at the sampling frequency $f_{chr}$=13.5 MHz. In this way it is achieved that a colour difference sample occurring at the input 3(2) or 3(3) is taken up in the relevant registers under the control of a write pulse clw$_{ch}$ but is only available at the output of that register whose logic output enable signal has the value "1" at that moment. In the embodiment chosen these logic output enable signals only change their value with the frame frequency. For the sake of completeness an embodiment of the control circuit required for generating the output enable signals is shown in FIG. 7. It comprises a toggle flip-flop 3.20 which receives the frame-synchronizing pulses FP occurring at a frequency of, for example 25 Hz. The output signal of this flip-flop 3.20 is directly applied to the registers 3.04(1) and 3.04(4) as logic output enable signals OE(1) and OE(4). The version of this output signal which is logically inverted by means of the inverter 3.21 is applied as logic output enable signals OE(2) and OE(3) to the registers 3.04(2) and 3.04(3), respectively.

The multiplexer circuits 3.30(.) have a similar construction and each of them comprises a first, or luminance register 3.33(.) and a second, or chrominance register 3.34(.) both of which are in the form of 3- state output fifos. The outputs of these two registers are connected to the output 3(4) or 3(5) of the distribution circuit. The input of the luminance register 3.33(.) is connected to the input 3.31(.) of the multiplexer circuit and has a capacity which is at least equal to the number of luminance samples of the active section of an active picture line. This luminance register 3.33(.) is controlled by write pulses clw'$_y$ which, likewise as the read pulses clr$_y$, occur at a frequency of 27 MHz; by a write-enable signal WE$_y$ indicating which one of the presented luminance samples can be read in the register; a read-enable signal RE$_y$ indicating when luminance samples can be read from this luminance register 3.33(.). The rate at which luminance samples are read from this luminance register is determined by those read pulses clr$_y$ which occur at a rate of 27 MHz and which pass an AND gate 3.35 controlled by the read-enable signal RE$_y$. The write-enable signal WE$_y$ activates the write operation of the luminance register 3.33(.) only for those luminance samples which are taken from the active section of an active picture line. The read operation is alternately activated by the read-enable signal E$_y$ during thirty-two clock pulse periods of clock signal cl and is deactivated during the subsequent Q=eight clock pulse periods, so that four luminance groups are consecutively applied to the output 3(4).

The input of the chrominance register 3.34(.) is connected to the input 3.32(.) of the multiplexer circuit and has a capacity which is at least equal to the number of colour difference samples taken from the active section of a picture line. This chrominance register is controlled by write pulses clw'$_{ch}$ which occur at a rate of 13.5MHz; by a write-enable signal WE$_{ch}$ which, likewise as the write-enable signal WE$_y$ of luminance register 3.33(.) indicates which one of the presented colour difference samples can be read in the chrominance register. Furthermore, this chrominance register is controlled by a read-enable signal RE$_{ch}$ indicating when colour difference samples can be read from this chrominance register 3.34(.). The rate at which this is effected is determined by read pulses clr$_{ch}$ which occur at a rate of 27 MHz and which are derived from the read-enable signal RE$_{ch}$ and the 27 MHz clock signal cl by means of an AND gate 3.36. More particularly, only those colour difference samples which are taken from the active section of an active picture line are written in the chrominance register 3.34(.). The read-enable signal RE$_{ch}$ enables the chrominance register 3.34(.) to read Q=eight colour difference samples (corresponding to one chrominance group) of this chrominance register whenever the read operation of the luminance register is deactivated and to apply them to the output 3(4) or 3(5). Consequently, it is achieved that four luminance groups and one chrominance group alternately occur at the output 3(4) as well as at the output 3(5) of this distribution circuit.

Figure 8:
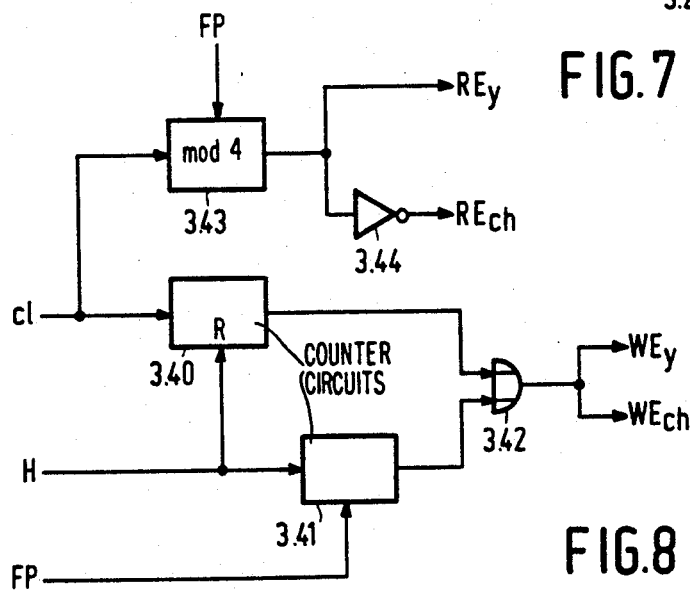

The different read-enable and write-enable signals for these registers 3.33(.) and 3.34(.) can be generated by means of a control circuit which may have a construction as shown in FIG. 8.

This control circuit comprises a counter circuit 3.40 which receives the clock pulses cl (27 MHz) and which is reset whenever a line-synchronizing pulse H occurs. This counter circuit supplies a logic "1" at the counts 160/2=80 to 784 (=1408/2+80). At the other counts it supplies a logic value "0". This counter thus defines the previously mentioned active section of an active picture line. This control circuit further comprises a line counter circuit 3.41 which receives the line-synchronizing pulses as counting pulses which is each time reset by a frame synchronizing pulse FP. This counter circuit 3.41 supplies a logic value "1" as long as its count corresponds to active picture lines. These are the picture lines 1 to 576 of each field in the case of high-definition television. The logic values supplied by the two counter circuits 3.40 and 3.41 are applied to an OR gate 3.42 whose output conveys a logic signal which is applied as a write-enable signal WE$_y$ to the luminance register 3.33(.) and which is applied as a write-enable signal WE$_{ch}$ to the chrominance register 3.34(.). The read-enable signals RE$_y$ and RE$_{ch}$ are derived from a modulo-40-counter circuit 3.43 which receives the clock pulses cl (27 MHz) as counting pulses and is reset by each frame-synchronizing pulse FP. This modulo-40-counter circuit 3.43 supplies a logic value "1" for each of the counts 0 to 31 and it supplies the logic value "0" for each of the counts 32 to 39. These logic values are directly applied as a read-enable signal RE$_y$ to the luminance register 3.33(.), while the version inverted by the inverter 3.44 is applied as a read-enable signal RE$_{ch}$; to the chrominance register 3.34(.).

E. GENERAL REMARKS

An embodiment of the distribution circuit 3 has extensively been described in the previous section, which embodiment can be used in the encoding station A of FIG. 1. An embodiment of the rearrangement circuit, which can be used in the decoding station B of FIG. 1, can be obtained by inverting the signal direction in the distribution circuit shown in FIG. 4 and by giving the write and read-enable signals the status of read and write-enable signals, respectively.

It is also to be noted that it has been assumed in the foregoing description that each picture comprises two interlaced fields. If this were not the case, each picture should be partitioned into picture line blocks of eight picture lines each for performing the luminance distribution mode Y-mod 6 and, for example the modulo-4-counter 3.15 which is used in the control circuit shown in FIG. 6 should be replaced by a modulo-8-counter.

In FIG. 2 it is shown at C and D that the inputs 3(2) and 3(3) of the distribution circuit only receive the colour difference samples of the odd picture lines. It will be obvious that an alternative choice is to apply only the colour difference samples of the even picture lines to these inputs. As is stated in Reference 1 it may be possible to apply the colour difference samples of the colour difference signal CH(1) of, for example the odd picture lines to input 3(2) and the colour difference samples of the colour difference signal CH(2) of the even picture lines to input 3(3), or conversely.

FIGS. 2, 3, 4 and 5 are based on the assumption that the ratio N between luminance and chrominance sampling frequency is equal to four. However, a different value may be taken for this ratio N. For example the value N=2 or the value N=3 frequently occurs in practice.

Furthermore the said FIGS. 2, 3, 4 and 5 are based on the assumption that the decimation factor R is equal to two. However, this decimation factor may alternatively be equal to 1. It may also have a value which is larger than two. If R=1, the vertical decimating means only consist of direct connections between the outputs of the A/D converters 1(2) and 1(3) and the corresponding inputs 3(2) and 3(3), respectively, of the distribution circuit 3. The vertically interpolating means 11(1) and 11(2) may then also be formed by direct connections between the outputs 10(2) and 10(3) and the inputs of the corresponding D/A converters 12(2) and 12(3), respectively.

If, for example N=3 and R=1, the distribution circuit is adapted to distribute each time six luminance groups and 4 chrominance groups between the two outputs 3(4) and 3(5). Each output then receives three such luminance groups, with, for example one chrominance group each time between two such luminance groups.

We claim:

1. A television transmission system for transmitting three digital picture signals, a luminance signal DY and two colour difference signals DCHR(1) and DCHR(2) through a transmission medium from a transmitter station to a receiver station, with a chrominance sampling frequency $f_{CHR}$ being associated with each colour difference signal and a luminance sampling frequency $f_y$ being associated with the luminance signal, $f_y$ being an integral multiple N of the chrominance sampling frequency, the transmitter station of said television system comprising:

a) an encoding station comprising:
  a(1) vertical decimating means receiving the two colour difference signals DCHR(1) and DCHR(2) and being adapted to perform a vertical decimation with a predetermined decimation factor R so as to generate auxiliary colour difference signals CH(1), CH(2);
  a(2) second means receiving the luminance signal and the two auxiliary colour difference signals for generating first and second auxiliary picture signals;
  a(3) a redundancy-reducing encoding circuit receiving the first and the second auxiliary picture signals and supplying first and second channel signals;
b) third means for converting the two channel signals into transmission medium signals for applying them to the transmission medium; and the receiver station comprising:
c) fourth means coupled to the transmission medium and which are adapted to receive the transmitted transmission medium signals and to regenerate the first and second channel signals therefrom;
d) a decoding station comprising;
  d(1) a redundancy-restoring decoding circuit receiving the first and second regenerated channel signals and converting them into local first and second auxiliary picture signals;
  d(2) fifth means receiving the two local auxiliary picture signals and converting them into one local luminance signal and two local auxiliary colour difference signals;
  d(3) vertically interpolating means receiving the two local auxiliary colour difference signals and being adapted to perform a vertical interpolation with a factor of R which is equal to the decimation factor;
characterized in that:
  the redundancy-reducing encoding circuit is adapted to perform a forward two-dimensional Q*Q transform;
  the second means are adapted to perform a distribution operation in which samples of the luminance signal DY and of the two auxiliary colour difference signals CH(1), CH(2) are partitioned into luminance and chrominance groups, respectively, with Q samples per group, each time of an even number of successive luminance groups and even number of chrominance groups, one half of said number of luminance groups and one half of said number of chrominance groups being arranged in a time-division multiplex format to form the first auxiliary picture signal and the other half of said number of luminance groups and the other half of said number of chrominance groups being arranged in a time-division multiplex format to form the second auxiliary picture signal;
  the redundancy-restoring decoding circuit is adapted to perform a two-dimensional Q*Q inverse transform; and
  the fifth means are adapted to perform a rearrangement operation which is inverse to the distribution operation.

2. A television transmission system as claimed in claim 1, wherein the even number of successive luminance groups is equal to 2N and the even number of chrominance groups is equal to 4/R.

3. A transmitter station suitable for use in a television transmission system as claimed in claim 1 and adapted to transmit three digital picture signals, a luminance signal DY and two colour difference signals DCHR(1) and DCHR(2), with a chrominance sampling frequency $f_{CHR}$ being associated with each colour difference signal and a luminance sampling frequency $f_y$ being associated with the luminance signal, $f_y$ being an integral multiple N of the chrominance sampling frequency, said transmitter station comprising:

a) an encoding station comprising:

a(1) vertical decimating means receiving the two colour difference signals DCHR(1) and DCHR(2) and being adapted to perform a vertical decimation operation with a predetermined decimation factor R so as to generate two auxiliary colour difference signals CH(1) and CH(2);

a(2) second means receiving the luminance signal and the two auxiliary colour difference signals CH(1) and CH(2) so as to generate first and second auxiliary picture signals;

a(3) a redundancy-reducing encoding circuit receiving the first and second auxiliary picture signals and supplying first and second channel signals;

b) third means for converting the two channel signals into transmission medium signals for applying them to the transmission medium;

wherein the redundancy-reducing encoding circuit is adapted to perform a two-dimensional forward $Q*Q$ transform;

the second means are adapted to perform a distribution operation in which the luminance signal DY and the two auxiliary colour difference signals CH(1) and CH(2) are partitioned into luminance and chrominance groups, respectively, with Q samples per group, each time of an even number of successive luminance groups and even number of chrominance groups, one half of said number of luminance groups and one half of said number of chrominance groups being arranged in a time-division multiplex format to form the first auxiliary picture signal and the other half of said number of luminance groups and the other half of said number of chrominance groups being arranged in a time-division multiplex format to form the second auxiliary picture signal;

4. A transmitter station as claimed in claim 3, wherein said even number of successive luminance groups is equal to 2N and the even number of chrominance groups is equal to 4/R.

5. A transmitter station as claimed in claim 3, wherein the luminance groups of the even number of successive luminance groups are alternately arranged to form the first and second auxiliary picture signals.

6. A transmitter station as claimed in claim 3, wherein successive chrominance groups of the first and second auxiliary colour difference signals CH(1), CH(2) are alternately arranged to form the first and second auxiliary picture signals.

7. A receiver station suitable for use in a television transmission system as claimed in claim 1 and suitable for receiving transmission medium signals which are transmitted via the transmission medium by a transmitter station, said receiver station comprising:

c) fourth means coupled to the transmission medium, which are adapted to receive the transmitted transmission medium signals and to regenerate the first and second channel signals therefrom;

d) a decoding station comprising:

d(1) a redundancy-restoring decoding circuit receiving the first and second regenerated channel signals and generating in response thereto local versions of the first and second auxiliary picture signals;

d(2) fifth means receiving the two locally generated versions of the two auxiliary picture signals for generating in response thereto a local version of the luminance signal and a local version of each of the two auxiliary colour difference signals;

d(3) vertically interpolating means receiving the local versions of the two auxiliary colour difference signals and being adapted to perform a vertical interpolation thereon with an interpolation factor R so as to generate local versions of the two colour difference signals;

wherein:

the redundancy-restoring decoding circuit is adapted to perform a two-dimensional inverse $Q*Q$ transform; and the fifth means are adapted to perform a rearrangement operation which is inverse to the distribution operation.

8. A transmission medium for use in a television transmission system as claimed in claim 1, wherein said transmission medium is constituted by an information carrier having a transmission channel for transmitting the first and second channel signals.

9. A transmitter station suitable for use in a television transmission system as claimed in claim 2 and adapted to transmit three digital picture signals, a luminance signal DY and two colour difference signals DCHR(1) and DCHR(2), with a chrominance sample line frequency $f_{CHR}$ being associated with each colour difference signal and a luminance sampling frequency frequency $f_y$ being associated with the luminance signal, $f_y$ being an integral multiple N of the chrominance sampling frequency, said transmitter station comprising:

a) an encoding station comprising:

a(1) vertical decimating means receiving the two colour difference signals DCHR(1) and DCHR(2) and being adapted to perform a vertical decimation operation with a predetermined decimation factor R so as to generate two auxiliary colour difference signals CH(1) and CH(2);

a(2) second means receiving the luminance signal and the two auxiliary colour difference signals for CH(1) and CH(2) so as to generate first and second auxiliary picture signals;

a(3) a redundancy-reducing encoding circuit receiving the first and the second auxiliary picture signals and supplying first and second channel signals;

b) third means for converting the two channel signals into transmission medium signals for applying them to the transmission medium;

wherein:

the redundancy-reducing encoding circuit is adapted to perform a two-dimensional forward $Q*Q$ transform;

the second means are adapted to perform a distribution operation in which samples of the luminance signal DY and the two auxiliary colour difference signals CH(1) and CH(2) are partitioned into luminance and chrominance groups, respectively, with Q samples per group, each time of an even number of successive luminance groups and even number of chrominance groups, one half of said number of luminance groups and one half of said number of chrominance groups being arranged in a time-division multiplex format to form the first auxiliary picture signal and the other half of said number of luminance groups and the other half of said number of chrominance groups being arranged in a time-division multiplex format to form the second auxiliary picture signal.

10. A transmitter station as claimed in claim 4 wherein the luminance groups of the even number of successive luminance groups are alternately arranged to form the first and second auxiliary picture signals.

11. A transmitter station as claimed in claim 4 wherein successive chrominance groups of the first and second auxiliary colour difference signals CH(1), CH(2) are alternately allocated to the first and second auxiliary picture signals.

12. A receiver station suitable for use in a television transmission system as claimed in claim 2 and suitable for receiving transmission medium signals which are transmitted via the transmission medium by a transmitter station, said receiver station comprising:
c) fourth means coupled to the transmission medium, which are adapted to receive the transmitted transmission medium signals and to regenerate the first and second channel signals therefrom;
d) a decoding station comprising:
 d(1) a redundancy-restoring decoding circuit receiving the first and second regenerated channel signals and generating in response thereto local versions of the first and second auxiliary picture signals;
 d(2) fifth means receiving the two locally generated versions of the two auxiliary picture signals for generating in response thereto a local version of the luminance signal and a local version of the two auxiliary colour difference signals;
 d(3) vertically interpolating means receiving the local versions of the two auxiliary colour difference signals and being adapted to perform a vertical interpolation thereon with an interpolation factor R so as to generate local versions of the two colour difference signals;

wherein:
the redundancy-restoring decoding circuit is adapted to perform a two-dimensional inverse Q*Q transform; and
the fifth means are adapted to perform a rearrangement operation which is inverse to the distribution operation.

13. A transmission medium for use in a television transmission system as claimed in claim 2 wherein said transmission medium is constituted by an information carrier having a transmission channel for transmitting the first and the second channel signals.

* * * * *